United States Patent [19]

Nuss

[11] Patent Number: 4,803,921

[45] Date of Patent: Feb. 14, 1989

[54] FOOD RECEPTACLE AND HEATING APPARATUS

[76] Inventor: Carol E. Nuss, 411 W. Lincoln, Wellington, Kans. 67152

[21] Appl. No.: 8,557

[22] Filed: Jan. 29, 1987

[51] Int. Cl.$^4$ ............................................. A47J 43/00
[52] U.S. Cl. ....................................... 99/483; 99/471; 99/450; 34/88
[58] Field of Search ................. 99/331, 447, 450, 471, 99/476, 483, 474, 467, 473, 475, 477, 323.9; 219/400, 585, 386; 34/193, 197, 171, 225, 88; 312/31, 31.2, 236; 126/21 A, 21 R; D7/325

[56] References Cited

U.S. PATENT DOCUMENTS

| | | | |
|---|---|---|---|
| D. 95,121 | 4/1935 | Cretors | D7/325 |
| 828,531 | 8/1906 | Caldwell et al. | 99/475 |
| 1,463,179 | 7/1923 | Stephens | 34/88 |
| 1,789,902 | 1/1931 | Jackson | 99/323.9 |
| 2,031,908 | 2/1936 | Sawin | 219/214 |
| 2,248,633 | 7/1941 | Lee | 34/88 |
| 2,458,190 | 1/1949 | Newburger | 312/236 |
| 2,529,877 | 11/1950 | Cadge | 34/225 |
| 2,875,013 | 2/1959 | Fitzgerald | 312/236 |
| 3,134,510 | 5/1964 | Cretors | 312/236 |
| 3,911,248 | 10/1975 | Buday et al. | 312/236 |
| 4,065,857 | 1/1978 | Nelson et al. | 34/197 |
| 4,425,720 | 1/1984 | Elevitch | 219/400 |

Primary Examiner—Henry J. Recla
Assistant Examiner—Linda J. Sholl
Attorney, Agent, or Firm—Philip A. Rein

[57] ABSTRACT

This invention relates to a food receptacle and heating apparatus to receive food products therein for receiving, displaying, and maintaining at a proper serving temperature which includes (1) a main container housing; (2) a food support assembly mounted within the main container housing to receive and transfer the food product therein; and (3) an air flow and temperature control assembly to provide for the flow of heated air therethrough. The main container housing includes a generally rectangular box shape basic housing assembly having a top lid member pivotally connected thereto. The food support assembly includes (1) a clean out tray member for receiving debris and food particles thereon; (2) a first inclined screen member to receive the food product thereon about to be removed therefrom; and (3) a second inclined screen member to hold the food product for initial heating before moving downwardly onto the first inclined screen member. The air flow and temperature control assembly includes a main blower assembly to receive inlet and transfer air; a heater assembly to receive air from the main blower assembly and heat same; and a circuit control assembly to control overall operation. The circuit control assembly includes a thermostat member operable to control operation of the main blower assembly and the heater assembly to provide for movement of the heated air from a lower portion of the main container assembly upwardly through the first and second inclined screen members to be discharged through holes in the top lid member.

6 Claims, 2 Drawing Sheets

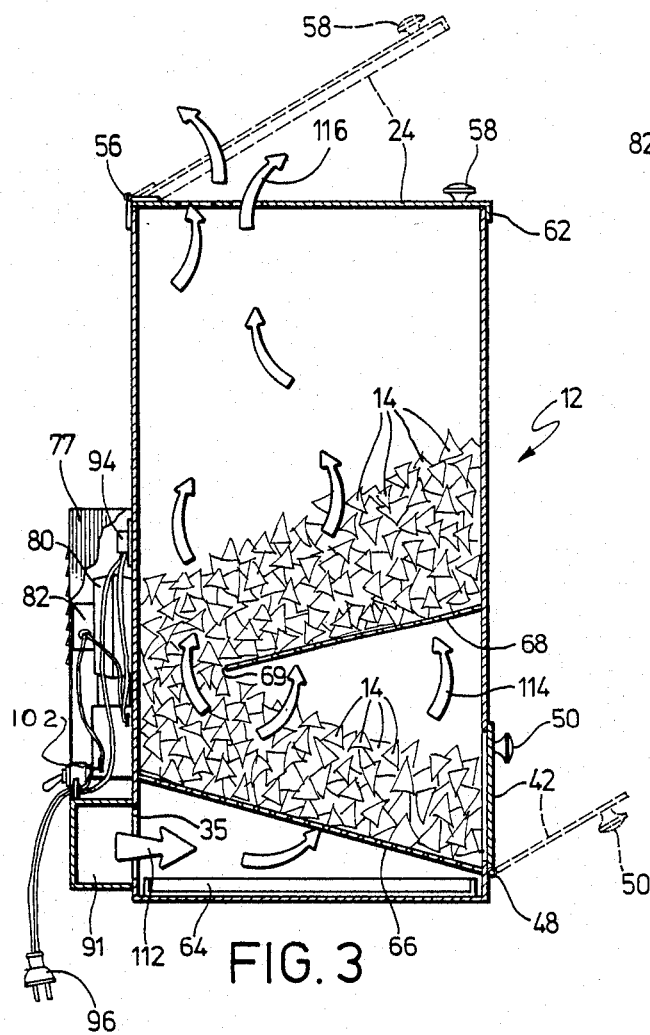
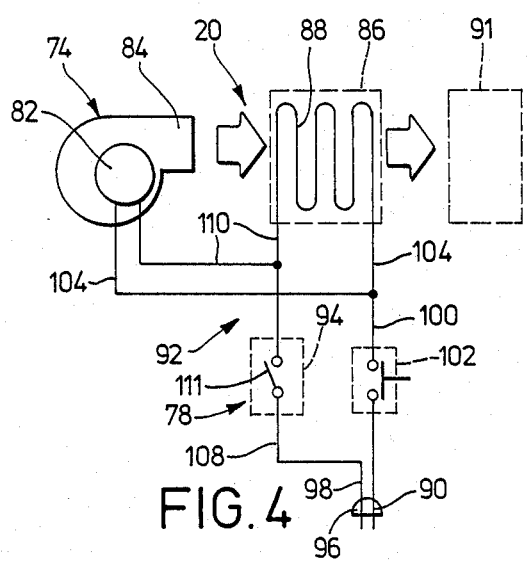
FIG. 3
FIG. 4

FOOD RECEPTACLE AND HEATING APPARATUS

PRIOR ART

A patentability search concerning this invention herein revealed the following United States Patents.

| Reg. No. | Patent | Inventor |
|---|---|---|
| 2,715,898 | FOOD WARMING AND CONDITIONING DEVICE | Michaelis et al |
| 3,327,092 | DISPLAY WARMER | Wilson |
| 3,545,832 | HEATED DISPLAY CASE | Levenback |
| 4,491,065 | FOOD HEATING APPARATUS | Poulson |
| 4,499,818 | METHOD AND APPARATUS FOR HOLDING FRESHLY PREPARED FRIED FOOD PRODUCTS | Strong |

The Michaelis et al patent discloses a roaster type structure used for food warming being provided with a front hinged door to gain access and the structure maintains a humidifying effect on the food therein.

The Strong patent discloses an apparatus for holding the prepared fried food products, having a conventional heater element and blower combination but does not have the numerous features of our invention.

The Levenback patent discloses a heated display case normally found in delicatessens and grocery stores to hold food products in excess of 140 degrees Fahrenheit. This structure is concerned with the product being maintained with a proper moisture content without further cooking and drying out of the food product.

The Wilson patent discloses another display warmer having a plurality of shelves with a conventional heater and blower structure to maintain the circulation of air therein.

The most pertinent patent appears to be Poulson for a food heating apparatus utilizing a heating chamber having a perforated food container rotatable therein. The hot air is forced through the openings in the rotatable food container in order to heat the food product therein. This structure would appear to operate to warm food products but is very complex in structure and not as easy to load and unload as our invention.

Therefore, it is noted that the entire combination of elements of the applicant's invention as set forth hereinafter is not revealed in the prior art search.

PREFERRED EMBODIMENT OF THE INVENTION

In one preferred embodiment of this invention, a food holding and heating apparatus is provided which includes a main container housing; a food support assembly mounted within the main container housing; and an air flow and food temperature control assembly operable to supply inlet air and heat for warming food product contained within the main container housing. The main container housing includes a basic housing assembly of generally rectangular box shape having a top lid member pivotally connected thereto. The basic housing assembly is provided with a front wall with an outlet door member pivotally connected thereto to selectively remove food product therefrom and a side wall having a clean out opening to remove a clean out tray member for periodic maintenance thereof. The top lid member is provided with a main lid body having a plurality of air discharge openings therein and being selectively opened to readily add food product therein to be heating. The food support assembly includes a clean out tray member supported on a bottom wall of the main container housing operable to collect food product particles for ready removal and maintenance thereof and first and second inclined screen members with parallel longitudinal axis mounted transversly in the basic housing assembly. The first screen member extends the entire length and width of the basic housing assembly and is inclined downwardly towards an outlet door member for selective removal of the heated food product when properly prepared. The second inclined screen member is mounted in an opposite inclination to the first inclined screen member and does not completely cover the area so that the food product can move downwardly as being heated and transversly of the basic housing assembly for subsequent removal therefrom thru the outlet door member. The air flow and food temperature control assembly includes a main blower assembly to receive inlet air and force the subject air towards a heater assembly, both of which are controlled by a circuit control assembly. The heater assembly is provided with a heater element to heat the air to the desired temperature. The heated air is directed into a lower portion of the basic housing assembly and moves upwardly through the first and second inclined screen members to heat the food product supported thereon. The circuit control assembly includes a thermostat member operable to maintain the proper temperature of the air within the main container housing to achieve the desired end result and function of this invention.

OBJECTS OF THE INVENTION

One object of this invention is to provide a food receptacle and heating apparatus including a main container housing adapted to receive food product in an upper end therein for moving downwardly and transversly in a contolled pattern and having an air flow and temperature control assembly to receive and heat inlet air to be moved transversly and upwardly through the food product to achieve a desired warming thereof.

One other object of this invention is to provide a food receptacle and heating apparatus including a main container housing with a basic housing assembly with a pivotal top lid member thereon having various openings therein to (1) add food product through the top lid member; (2) to selectively remove heated food product through a lower outlet door member; (3) a lower air distributor or inlet opening to distribute heated air throughout the basic housing assembly; and (4) a clean out tray door operable to be opened to remove a clean out tray member for periodic maintenance.

One other object of this invention is to provide a food receptacle and heating apparatus including a main container housing with a food support assembly mounted therein having first and second inclined screen members operable to receive a food product thereon for its subsequent travel laterally and downwardly for a sufficient time period for heating to the proper temperature.

Still, one other object of this invention is to provide a food receptacle and heating apparatus which is economical to operate; easy to add and remove food product; automatic in controlled heating operation; generally maintenance free; easy to maintain in a sanitary condition; economical to manufacture; and reliable in operation.

Various other objects, advantages, and features of this invention will become apparent to those skilled in the art from the following discussion, taken in conjunction with the accompanying drawings, in which:

FIGURES OF THE INVENTION

FIG. 3 is a sectional side elevation view taken inside one end wall illustrating the inlet and outlet door members in the opened positions in dotted lines and a portion broken away for clarity; and FIG. 4 is a schematic diagram illustrating a circuit control assembly of the food receptacle and heating apparatus of this invention.

Figure 1:
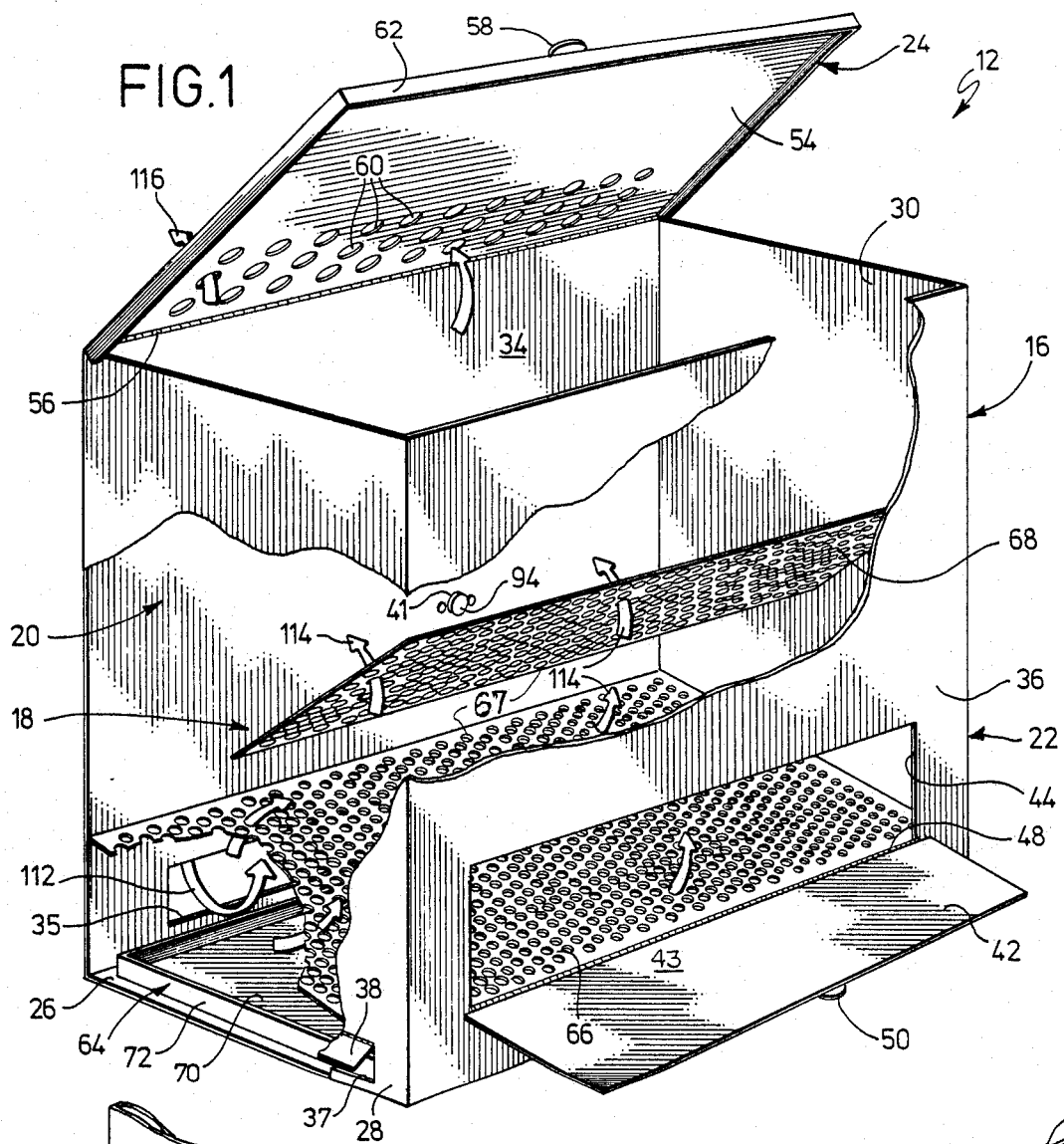
FIG. 1 is a perspective view of the food receptacle and heating apparatus of this invention having inlet, outlet, and clean out door members shown in the open position and portions broken away for clarity.

The following is a discussion and description of preferred specific embodiments of the food receptacle and heating apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and in particular to FIG. 1, a food receptacle and heating apparatus of this invention, indicated generally at 12, is operable and utilized to hold food product therein such as food chips 14 noted in FIG. 3. The food receptacle and heating apparatus 12 includes (1) a main container housing 16; (2) a food support assembly 18 mounted within the main container housing 16 to receive and convey the food chips 14 thereon; and (3) an air flow and food temperature control assembly 20 operable to receive the ambient air to heat and blow same through the food support assembly 18 and the food chips 14 for progressively and properly heating to the desired temperature.

The main container housing 16 is of generally rectangular box shape having a basic housing assembly 22 with a top lid member 24 pivotally connected thereto. The basic housing assembly 22 includes (1) a bottom-wall 26; (2) spaced parallel end walls 28, 30 extended upwardly and integral with the bottom wall 26; (3) a back wall 34 secured along the bottom and side edges to the respective bottom wall 26 and end walls 28, 30; and (4) a front wall 36 connected to the other edges of the bottom wall 26 and end walls 28, 30 and extended upwardly therefrom.

The end wall 28 is provided with a clean out opening 37 near a lower portion thereof having a clean out door member 38 secured by a clean out hinge member 39 about the clean out opening 37. The clean out door member 38 is provided with a knob member 40 so as to pivotally and periodically open same for maintenance purposes in a manner to be explained.

The back wall 34 is provided with an air diffuser or inlet opening 35 to receive and distribute heated inlet air to the interior of the basic housing assembly 22 in a manner to be explained and having a thermostat opening 41 therein.

As noted in FIG. 1, the front wall 36 is provided with an outlet door member 42 which is pivotally connected about a rectangular opening 44. The outlet door member 42 is provided with a main door body 43 pivotally connected along a lower edge by a hinge member 48 and a knob member 50 for ease of grasping and pivotally moving from the open to the closed conditions as noted in solid and dotted lines, respectively, in FIG. 3.

As best shown in FIG. 1, the top lid member 24 is provided with a main lid body 54 pivotally connected by a piano type lid hinge member 56 along the upper surface of the back wall 34 and having a lid knob member 58 connected to an upper surface of the main lid body 54 for ease of grasping and opening.

The main lid body 54 is of generally rectangular shape having a plurality of openings or holes 60 therein and providing about an outer peripheral edge of the main lid body 54 with a downwardly depending flange section 62 which contacts the upper top surfaces of end walls 28, 30 and front wall 36. The holes 60 are constructed of a desired size and configuration in conjunction with that of the air flow and food temperature control assembly 20 so as to provide for exit of heated air flow therethrough. The holes 60 are of a size to permit the air flow to maintain a sufficient temperature and time of flow through the food support assembly 18 to heat the food product or chips 14.

As noted in FIGS. 1 and 3, the food support assembly 18 includes (1) a clean out tray member 64; (2) a first inclined screen or shield member 66; and (3) a second inclined screen or shield member 68. The clean out tray member 64 is provided with a bottom wall section 70 having about its outer peripherally an upwardly extended flange sections 72. It is noted that the clean out tray member 64 is adapted to receive debris such as food particles thereon to be removed and dispensed with during periodic maintenance.

The first screen member 66 is positioned above the air inlet opening 35 in the back wall 34 and is inclined therefrom downwardly and forwardly to a position even with or below the rectangular opening 44 in the front wall 36. The first screen member 66 is of a sufficient length and width so as to completely cover the cross-sectional area of the basic housing assembly 22 and having a plurality of openings 67. The angle and inclination of the first inclined screen member 66 is such that it uses force of gravity to move the food chips 14 downwardly towards the outlet door member 42.

The second inclined screen member 68 resembles the first screen member 66 as far as the openings or holes 67 but is inclined in a reversed direction. The second screen memberf 68 is equal in length to that of the first screen member 66, but of a lesser width so as to leave an open area indicated at 69 to permit the food product or chips 14 supported thereon to move downwardly onto the upper portion of the first screen member 66 for continued heating thereof.

The air flow and food temperature control assembly 20 includes (1) a main blower assembly 74 secured to the back wall 34 of the basic housing assembly 22; (2) a heater assembly 76 connected to an outlet portion of the main blower assembly 74; (3) a heater and blower housing 77; and (4) a circuit control assembly 78 operably connected to the main blower assembly 74 and the heater assembly 76.

Figure 2:
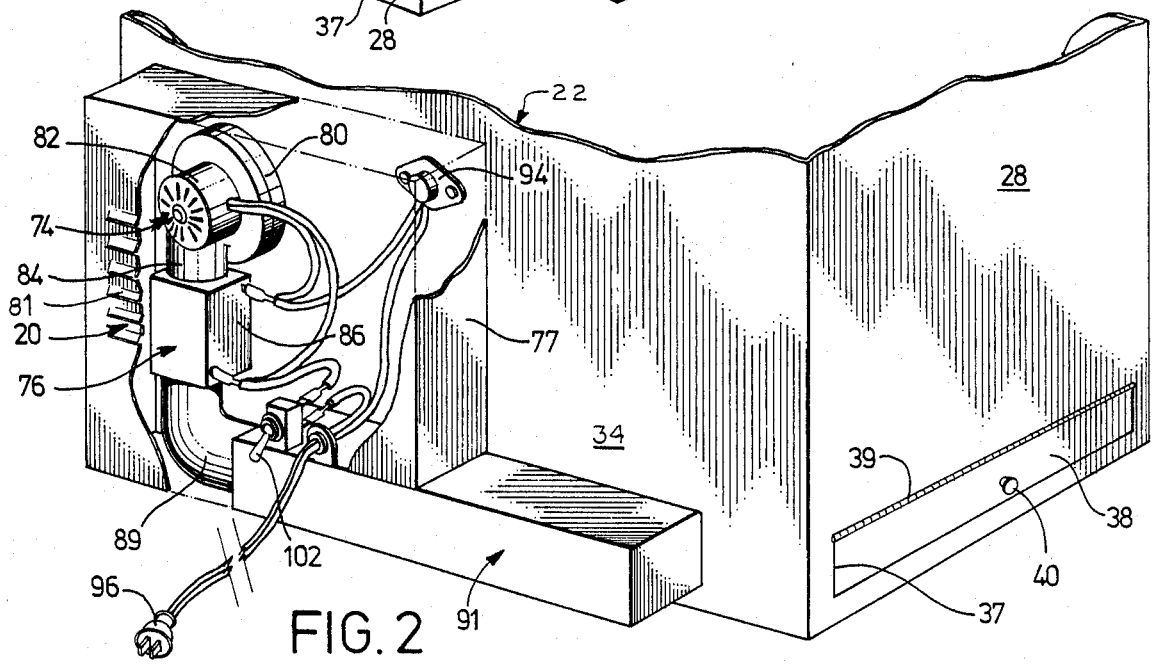
FIG. 2 is a fragmentary perspective view of a rear portion of this invention having a portion broken away for clarity.

As noted in FIG. 2, the main blower assembly 74 includes a blower housing 80 having a blower motor 82 to drive a conventional fan section to force inlet air through an air outlet housing 84. The main blower assembly 74 is operable similar to a vacuum motor member to receive air flow through louver members 81 to provide the inlet air to the blower motor 82 to discharge same under pressure through the air outlet housing 84.

The heater assembly 76 includes an outer heating housing 86 having a heater element 88 therein. The heater element 88 is operable on receiving the air from the air outlet housing 84 to heat same to the desired temperature. The heated air moves through a discharge housing 89 which, in turn, is connected to an air distributor housing 91. As noted in FIG. 3, the heated air moves through the air inlet opening 35 in the back wall 34 as will be explained.

The circuit control assembly 78 includes (1) an inlet power cord 90; (2) an electrical circuit 92 connected to the inlet power cord 90; and (3) a thermostat member 94 which automatically controls operation of the blower motor 82 and the heater element 88 as will be noted.

The inlet power cord 90 is of a conventional nature having a plug member 96 adapted to be placed in a conventional electrical outlet such as 110 volt A.C.

As noted in FIG. 4, the electrical circuit 92 includes (1) lines 98 and 100 connected to the plug member 96; (2) an on/off switch 102 mounted in the line 100 to control power supply to the main blower assembly 74 and the heater assembly 76; (3) a line 104 connected from line 100 to one side of the heater element 88 and additionally to one side of the blower motor 82; (4) a line 108 connected to the line 98 and one side of the thermostat member 94; and (5) a line 110 which is connected from the therostat member 94 to supply the other power line to the heater element 88 and the blower motor 82.

The thermostat member 94 may be of a bi-metallic type heat sensitive switch structure which is operable, on reaching a predetermined temperature, to open or close a switch member 111 which, in turn, would concurrently energize or de-energize the heating element 88 and the blower motor 82 for proper operation as will be explained.

USE AND OPERATION OF THE INVENTION

In the use and operation of the food receptacle and heating apparatus 12 of this invention, the main container housing 16 is utilized to hold food product 14 therein such as popcorn, potato chips, tortilla chips, or nacho chips as desired. The main function of the invention is the proper holding and separation of the food product while allowing a sufficient amount of heated air to pass therethrough to maintain the proper temperature of the subject food product. This invention has been particularly noteworthy for use in a final food product known as "Nachos and Cheese" whereupon a plurality of nacho chips are placed on a serving dish and covered with spicy cheese. It is important that the nacho chips be used in a sufficiently heated condition for the maximum enjoyment of the "Nachos and Cheese" combination.

In the use of the food receptacle and heating apparatus 12, the bottom wall 26 is supported on a serving counter, table or the like and the power supply is provided by placing the plug member 96 of the inlet power cord 90 in a 110 volt AC electrical outlet receptacle.

The top lid member 24 has the main lid body 54 moved upwardly about the lid hinge member 56 to an open or semi-open condition as noted in FIG. 1. Then, the interior of the basic housing assembly 22 is filled with the food chips 14 as so desired. A major portion of the food chips 14 would be supported on the top surface of the second inclined screen member 68 but some of the food product would move downwardly through the open space 69 on to the first inclined screen member 66 as noted in FIG. 3.

After being initially loaded, the top lid member 24 and the outlet door member 42 are moved to the closed condition as shown in solid lines in FIG. 3.

Next, the on/off switch 102 would be activated to the closed or energized position to allow electrical current from the plug member 96 to move through the line 98 to the thermostat member 94. The thermostat 94 utilizes a sensing element extended through the back wall 34 of the basic housing assembly 22. The themostat member 94 will be of an adjustable type so that a predetermined temperature can be maintained within the main container housing 16. The switch member 111 is operable on reaching a both a high and/or a low temperature setting to insure that (1) the heating elment 88 will be energized with the blower member 82 if the temperature is not sufficient within the basic housing assembly 22; and (2) when an excessively high temperature limit is reached in the main container housing 16, it would cause an opening of the switch member 111 to de-energize the heating element 88 and the blower member 82.

On closing of the switch member 111, it is seen that the blower member 82 and the heater element 88 are energized whereupon the inlet air is first moved through the louver members 81 into the blower housing 80. The blower motor 82 is operable to force the inlet air through the air outlet housing 84 into the heater assembly 76. At this point, the moving air is heated by the heater element 88 and moves through the discharge housing 89 into the air distributor housing 91. Next, the heated air is discharged through the air inlet opening 35 in the back wall 34. At this time, the heated air, indicated by arrow 112, is distributed and moves upwardly through the first inclined screen member 66 and holes 67 to contact the food chips 14 resting thereon. The heated air continues its flow upwardly through the food chips 14 and the holes 67 in the bottom surface in the second inclined screen member 68 as shown by arrows 114. This heated air moves upwardly, as noted in FIG. 3, until discharged through the holes 60 in the closed top lid member 24 into the atmosphere.

It is noted that the movement of the heated air into the main container housing 16 operates to have the initially heated air contact the food chips 14 resting on the first inclined screen member 66 so as to transfer heat to the food chips 14 in a greater amount as these are adjacent the outlet door member 42 and next to be removed.

The operator of the food receptacle and heating apparatus 12 may move the outlet door member 42 to the open condition as shown in dotted lines of FIG. 3 in order to remove the heated food chips 14 therefrom. On closing the outlet door member 42 and, due to the movement of the air flow therethrough, it is obvious that the remaining food chips 14 would move downwardly on the inclined surfaces of the first and second screen members 66, 68 under force of gravity. Of course, the basic housing assembly 22 can be restocked with food chips 14 as desired and the novel operation allows the gradual heating of the food chips 14 as they move downwardly on the reversely inclined first and second screen members 66, 68.

It is seen that the food receptacle and heating apparatus of this invention is an attractive, compact structure having means to provide for automatic operation thereof. The front wall, the end walls, and the top wall can be constructed of a transparent material so that the customers can observe the operation and the heated nature of the food chips so as to increase product appeal and resultant food sales.

It is seen that the food receptacle and heating apparatus of this invention is easy to operate; efficient in the operation of the heat transfer function; substantially maintenance free; and relatively inexpensive to manufacture. It is obvious that the various holes in the top lid member and the first and second inclined screen members can be adjusted to achieve the desired rate of air flow in conjunction with the output from the main blower assembly and the heater assembly so as to achieve the proper heating of the food product. Also, the thermostat member can be adjusted and regulated so as to maintain the proper temperature therein and prevent the overheating or burning of the heated food product.

While the invention has been described in conjunction with preferred specific embodiments thereof, it will be understood that this description is intended to illustrate and not to limit the scope of the invention, which is defined by the following claims.

I claim:

1. A food receptacle and heating apparatus adapted to receive food products such as chips therein for the purpose of receiving, holding, displaying, heating, and dispensing therefrom, comprising:
   (a) a main container housing having an enclosed basic housing assembly with a lid member pivotally connected thereto and a lower outlet door member selectively movable from a closed to an opened condition to remove the food product therefrom;
   (b) said lid member having a plurality of holes therein to permit the flow of discharge air therethrough;
   (c) a food support assembly mounted within the interior of said basic housing assembly having a first inclined screen member extended upwardly from said outlet door member to receive the food product thereon for transfer under the force of gravity and downwardly and laterally thereon;
   (d) said first inclined screen member having a lower edge positioned adjacent a lower edge of said outlet door member to support and direct the food product thereto;
   (e) an air flow and temperature control assembly having a main blower assembly, a heater assembly, and a circuit control assembly operably connected to the main container assembly;
   (f) said heater assembly connected to an output of said main blower assembly to heat the air flowing therethrough and direct the heated air internally of said basic housing assembly below said food support assembly; and
   (g) said circuit control assembly operable to selectively energize said main blower assembly and said heater assembly to control the heating of the air flow through said food support assembly to properly heat the food product mounted thereon.

2. A food receptacle and heating apparatus as described in claim 1, wherein:
   (a) said basic housing assembly includes a bottom wall with integral, vertically extended end walls; a back wall; and a front wall;
   (b) said front wall having said outlet door member thereon which can be selectively movable from a closed to an opened condition to remove food product therefrom; and
   (c) said first inclined screen member extended in a common plane upwardly from said front wall to said back wall and between said end walls to completely cover the area therebetween.

3. A food receptacle and heating apparatus as described in claim 2, wherein:
   (a) said back wall having an air diffuser opening therein extended substantiating a width of said back wall operably associated with said air flow and temperature control assembly to diffuse the heated air substantially the width of said first inclined screen member for heating the food product.

4. A food receptacle and heating apparatus as described in claim 1, wherein:
   (a) said food support assembly includes a second inclined screen member mounted above said first inclined screen member in a reversed inclination relative to said first inclined screen member so as to initially receive food chips thereon and direct downwardly toward an opening between said second inclined screen and said main container housing in a reverse direction so that the food chips are movable under gravity downwardly and laterally towards the upper portion of said first inclined screen member.

5. A food receptacle and heating apparatus as described in claim 4, wherein:
   (a) said first inclined screen member and said second inclined screen member having parallel and horizonally extended longitudinal axis.

6. A food receptacle and heating apparatus as described in claim 2, wherein:
   (a) one of said end walls having a clean out door positioned adjacent said bottom wall; and
   (b) said food support assembly includes a clean out tray member mounted on said bottom wall and selectively removable for maintenance purposes through said clean out door.

* * * * *